United States Patent [19]

Nuzman

[11] 4,254,831
[45] Mar. 10, 1981

[54] METHOD AND APPARATUS FOR RESTORING AND MAINTAINING UNDERGROUND AQUIFER WATER SYSTEM

[75] Inventor: Carl E. Nuzman, Silver Lake, Kans.

[73] Assignee: Layne-Western Company, Inc., Mission, Kans.

[21] Appl. No.: 107,566

[22] Filed: Dec. 27, 1979

[51] Int. Cl.³ .................... E21B 43/27; E21B 43/30
[52] U.S. Cl. .................................. 166/245; 166/52; 166/75 R; 166/252; 166/271
[58] Field of Search ........... 166/245, 271, 307, 305 R, 166/244 C, 310, 279, 52, 75 R, 252, 266; 210/60, 61

[56] References Cited

U.S. PATENT DOCUMENTS

| 2,768,694 | 10/1956 | Moll et al. ............................ 166/307 |
| 3,076,762 | 2/1963 | Dill ...................................... 166/307 |
| 3,251,415 | 5/1966 | Bombardieri et al. ............... 166/307 |
| 3,490,534 | 1/1970 | Grady .................................. 166/271 |
| 3,649,533 | 3/1972 | Reijonen et al. ..................... 210/50 |
| 3,710,867 | 1/1971 | Bansbach .......................... 166/244 C |

OTHER PUBLICATIONS

Bennison, E. W., "Fundamentals of Water Well Operation and Maintenance", Journal A.W.W.A., Mar. 1953, pp. 252–258.
Hallberg et al., "Vyredox–In Situ Purification of Ground Water", Ground Water, vol. 14, No. 2, Mar.-Apr. 1976, pp. 88–93.
Russell, R. H., "Artificial Recharge of a Well at Walla Walla", Journal A.W.W.A., Nov. 1960, pp. 1427–1437.

Primary Examiner—Stephen J. Novosad
Attorney, Agent, or Firm—Schmidt, Johnson, Hovey & Williams

[57] ABSTRACT

A method and apparatus are disclosed for restoring and/or maintaining an underground aquifer water supply system plagued with decreased water flow attributable to accumulation of undesirable flow impeding agents in the aquifer wherein a plurality of injection wells are drilled in the ground in surrounding relationship to the production well and a part of the water from the discharge thereof is treated with an additive capable of altering the nature of the plugging agents and returned to the aquifer via the satellite injection wells on a continuous basis. The proportion of bypass and recycle treatment water sent back to the aquifer may be varied with up to 50% normally being recycled for well restoration purposes while only about 10% need be returned for maintenance of the well flow at a desired level.

20 Claims, 4 Drawing Figures

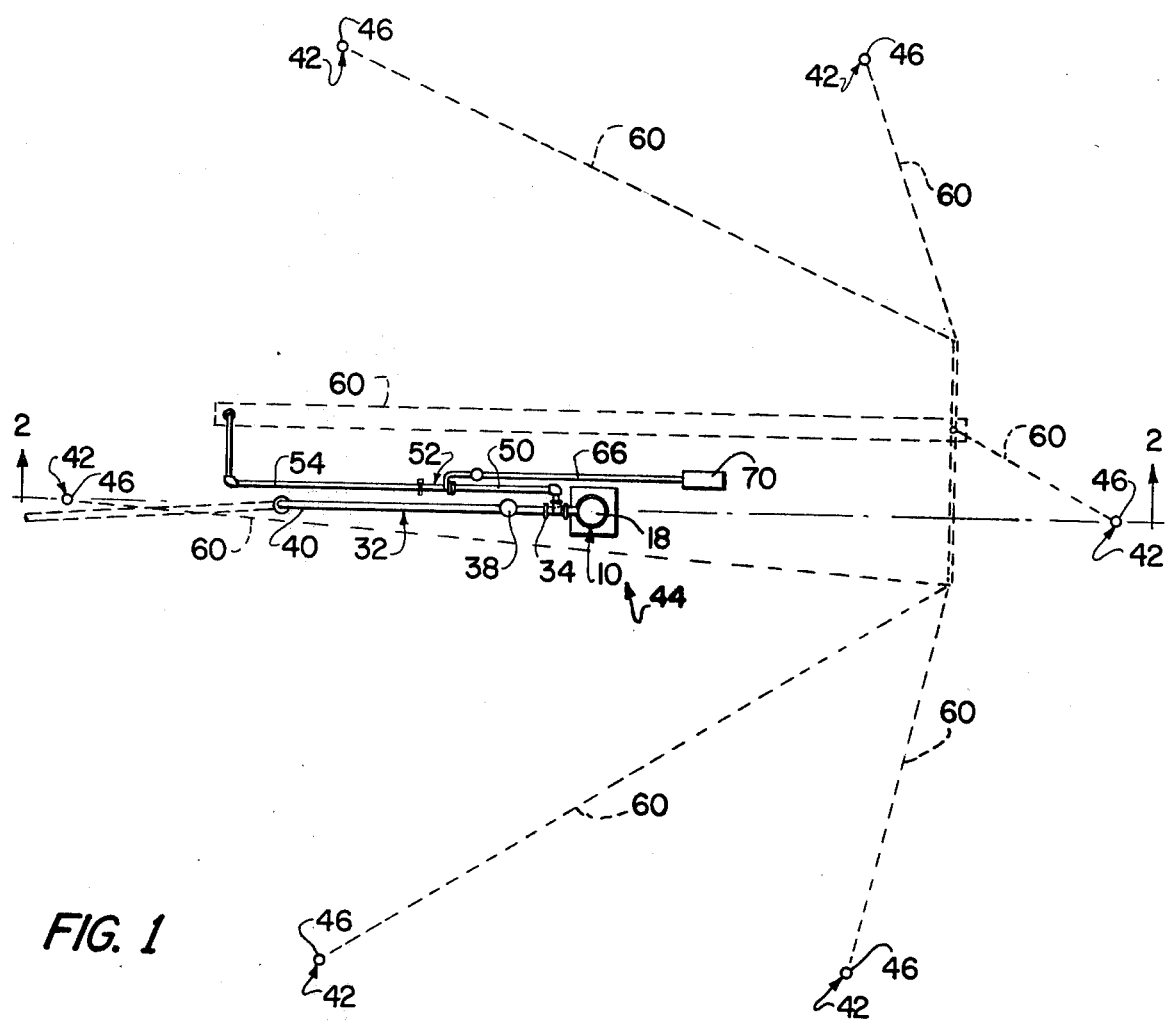
FIG. 1
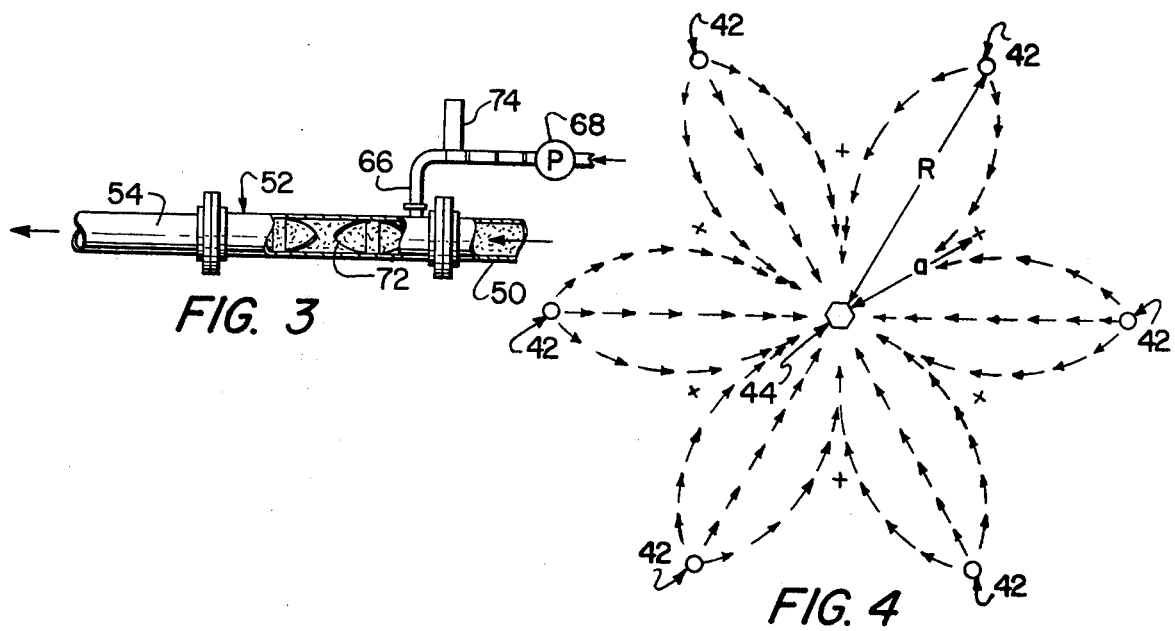
FIG. 3
FIG. 4

METHOD AND APPARATUS FOR RESTORING AND MAINTAINING UNDERGROUND AQUIFER WATER SYSTEM

BACKGROUND OF THE INVENTION

A. Field of the Invention

This invention relates to a method and apparatus for restoring and/or maintaining an underground aquifer water supply system wherein the output flow has fallen significantly below optimum levels because of plugging of the aquifer with flow impeding deposits which have accumulated in the porous substrate of the waterbed.

It especially relates to a process and system which minimizes or entirely eliminates the need for well downtime during treatment and allows design of a restoration or maintenance procedure which is specific for each problem well encountered depending on the nature of the flow impeding materials which have accumulated in the aquifer.

B. Description of the Prior Art

It is known that ground water in some locales has an excessive content of iron and manganese. The quality of the water can vary greatly over small distances. In those cases where the iron and manganese content of the ground water are so high to preclude effective usage thereof, it is necessary that these metals be removed before the water can be employed for drinking or industrial purposes.

It is further known that iron occurs in two states of oxidation in an aquifer—the divalent (ferrous) and trivalent (ferric) forms. U.S. Pat. No. 3,649,533 discloses a process for increasing the amount of oxygen available in the strata around a producing well whereby iron and manganese oxidixing bacteria assist in oxidation of the ferrous iron and also enhance oxidation of the manganese. In accordance with the process of the patent, a number of aeration wells are placed in a ring around the supply well. Water which has been enriched with oxygen or an oxygen supplying agent is forced down the aeration wells as a slug of water which then disperses into the aquifer surrounding the production well casing. The oxygen-rich water provides a suitable habitat for the iron and manganese oxidizing process. It is taught that the water slug treatment should be carried out at infrequent, extended intervals depending upon the amount of undesirable iron and manganese compounds in the water to maintain a certain maximum level of such constituents in the water. It is indicated that the precipitation of iron in the aquifer has only a slight effect on strata permeability. Cloggage of the aquifer surrounding the well is not thought to occur for a period of time much longer than the life span of a typical well.

It has also been proposed in the past to remove a quantity of water from the producing well, collect the same in a treatment vessel, add a chemical agent thereto, and then pump such treated water as a slug back down into the well through the well casing so that the treatment composition may then slowly spread out into the aquifer for a predetermined distance from the casing intake. Generally, the water is finally pumped out of the aquifer and the level of treatment agent therein monitored until it has fallen to an acceptable level. Until this low level concentration is reached though, the water must be directed to effluent.

General fundamentals of water well operation and maintenance are described in an article by E. W. Bennison, March 1953 publication of the Journal of A.W.W.A. commencing at page 252. In that article, the author describes the three most common causes for well failure. Two of the problems are primarily mechanical in nature in connection with the well equipment and its operation, while the third involves deterioration of the well during its life due in part to accumulation of flow impeding agents in the aquifer surrounding the production casing.

SUMMARY OF THE INVENTION

In accordance with the improved process and apparatus of this invention, well operators who experience reduced flow from a particular production well attributable to collection of agents in the aquifer which impede flow of water toward the well, may treat the aquifer to restore and maintain a desired flow rate by drilling a series of satellite injection wells in circumscribing relationship to the production well, and then inject into the satellite wells on a continuous basis water containing a treatment additive which comprises a part of the production water which is bypassed from the main stream and recycled back into the aquifer. Treated water injected into the aquifer through respective injection wells tends to spread out from a corresponding injection site and then decrease in area as the well casing is approached. The injection wells are strategically located such that there is a slight overlap of the treated water flowing toward the production well so that it is not possible for significant quantities of untreated water to flow into the main well for pumping therefrom.

The chemical additive introduced into the bypass and recycle water is preferably acidic in nature to effect precipitation of carbonate compounds in the aquifer, to sterilize the water and clean up the water bearing strata to an extent to improve water flow toward the main well casing. Best results are obtained by first diverting up to 50 percent of the main stream back into the satellite wells in conjunction with a relatively high concentration of treatment additive incorporated therein, and to then decrease the recycle ratio after the water bearing formation has been subjected to the relatively acidic environment for an adequate period of time. However, it is contemplated that recycle of a proportion of the production water be carried out on a continuous basis with about 10 percent of the main stream being returned to the aquifer with a lower concentration of additive therein, to maintain the water flow rates at the restoration levels.

By virtue of the fact that the restoration and maintenance program may be tailored to solve a specific problem encountered, the treatment may be maximized and downtime of the well when water therefrom is directed to effluent, may be kept at a minimum.

BRIEF DESCRIPTION OF THE DRAWING

FIG. 1 is a schematic plan view of a preferred embodiment of equipment and a process for carrying out the concepts of this invention wherein a series of satellite injection wells have been drilled into the ground in surrounding relationship to a centrally located production well with structure being provided to introduce a chemical treatment additive into water bypassed from the production supply and returned to the aquifer via the injection wells;

FIG. 3 is an enlarged fragmentary partial sectional view also schematic in nature illustrating the chemical additive injection and mixing components of the treatment apparatus; and FIG. 4 is a schematic view of the arrangement illustrated in FIG. 1 and showing the flow pattern of treatment water within the aquifer toward the production well.

DESCRIPTION OF THE PREFERRED EMBODIMENT

Figure 2:
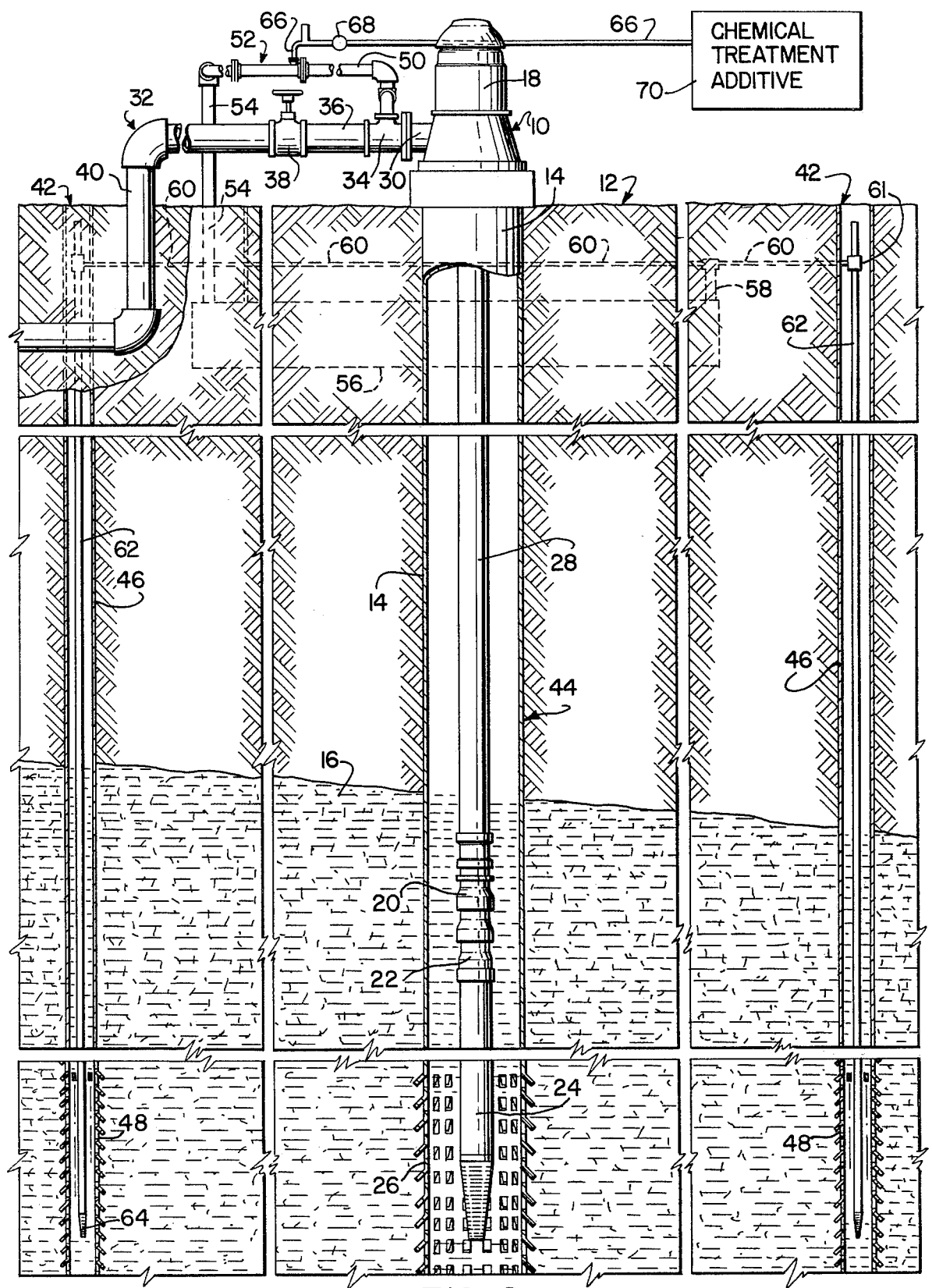
FIG. 2 is an essentially schematic vertical cross-sectional view taken substantially on the line 2—2 of FIG. 1 and looking in the direction of the arrows.

Alluvial filled aquifers consist of sands and gravels having field coefficients of permeability that can be related to theoretical permeability. As a consequence, a calculated permeability utilizing empirically established constants may be utilized with adjustment for specific field conditions to determine the apparent coefficient of water transmissivity at a specific water well site and used for the natural formation flow yield design rate. Transmissivity may be defined as the rate at which water will flow through a unit width of aquifer. Generally speaking, the relationship of permeability to transmissivity can be obtained by multiplying the coefficient of permeability times the thickness in feet of like material. If the coefficient of permeability as determined by sampling methods varies greatly from test to test, then the empirically determined coefficient of permeability is multiplied by the effective thickness, in feet, in that characteristic of the material being tested. The various coefficients of permeability are then multiplied by the number of feet of each aquifer layer and added to determine the effective empirical estimate of transmissivity. Thus transmissivity (T) may be determined as the product of the estimated permeability ($K_g$) times the thickness of formation in feet. Based on this information, the natural formation estimated yield can be calculated in accordance with the following formula:

$$O_{well} = D_I \times L_s \times K_g / 5500$$

where:

$O_{well}$ is natural formation yield to a well in g.p.m.
$D_I$ is the well bore hole diameter in inches
$L_s$ is the length of well screen in feet
$K_g$ is the formation permeability in gallons per day per square foot.

These same techniques can be utilized to assess the performance of a specific well and if the yield has decreased below theoretical and the reason has been found to be other than lowering of the natural water table, there is a need to treat the well in a manner to return its yield to a level as close as possible to theoretical. Oftentimes lowering of yield can be attributed to plugging of the well and blocking of water flow through the laminated aquifer formation by virtue of an accumulation of solid or gelatinous materials such as calcium carbonate, calcium bicarbonate, iron complexes, bacterial residues, and phosphate accumulations on the grains of sand in the water bearing strata.

It has now been discovered that by calculating the theoretical quantity of water in the aquifer which supplies a particular well at its theoretical yield rate and then boring a sufficient number of injection wells in surrounding relationship to the main well permitting a chemical treatment agent to be introduced into the aquifer, first at a cleansing concentration, and then at a yield maintenance level, the well can be restored toward its original efficiency and maintained at such flow rate over an extended period of time. In order to accomplish this desired result though, it is necessary that the introduction of the chemical treatment additive at a concentration for restoration purposes be carried out on a continuous basis for a period of time, and that the additive also be delivered to the aquifer at specific points and at a maintenance concentration without interruption during operation of the well for water supply purposes.

The initial steps in carrying out the process of this invention involve first establishing the aquifer formation thickness for the well which requires restoration toward original theoretical yield parameters. Next, the screen length in the production well should be ascertained. The formation permeability should be confirmed using known laboratory techniques in conjunction with empirically known parameters for aquifers. Then the formation coefficient of storativity is determined. Storativity is that fractional portion of the saturated aquifer mass that will readily drain water. The two day volume-radius for net daily pumpage of the production well is calculated and this radius is used for distance in spacing of injection wells around the production well. Generally speaking it has been found that best results are obtained by using six injection wells in a hexagon pattern. Each of the injection wells preferably is cased with a synthetic resin inert type material which is resistant to acidic materials. Best results are obtained by using a six inch minimum diameter polyvinyl chloride or glass fiber reinforced epoxy casing. The installed injection well screen length or length of the slotted part of the casing inserted in the injection wells should, for best results, be equal to or exceed the production well screen length. However, under certain conditions, this parameter may not be required. Next, the mechanical equipment for treating the well is installed in accordance with the schematic representations of the drawings forming a part of this application.

Referring to those drawings, FIG. 1 illustrates a typical production well site wherein a vertical turbine pump 10 (FIG. 2) is located at ground level 12 atop a casing 14 which extends downwardly through the ground into an underlying water bearing aquifer bed 16. Pump 10 typically has a motor 18 which drives suitable pump impellers (not shown) within bowl stages 20 above a suction nozzle 22 above a terminally perforated suction pipe 24. The lower extremity 26 of casing 14 is also suitably perforated for entrance of water into the interior of the casing for delivery to ground level via discharge pipe 28 of pump 10.

The discharge outlet 30 of pump 10 is connected to a discharge line broadly designated 32.

It is to be appreciated that the specific structure shown in FIG. 2 with respect to the water discharge line 32 is for schematic purposes only and that the actual piping arrangements employed for a particular restoration and well treatment operation will vary depending upon the particular requirements and physical constraints at a specific well site. Thus, for illustration purposes only, FIG. 2 depicts a tee 34 being flanged to discharge outlet 30 with the through leg of the tee being connected to a pipe 36 having a water diversion control valve 38 therein. The remaining piping 40 of line 32 extends to a point of use of the water.

As previously explained, in a preferred embodiment of the apparatus of this invention and in accordance with the best mode of carrying out the process hereof, a series of injection wells broadly designated 42 are drilled in the ground in a hexagon pattern around the main well 44 and spaced from one another as well as the production wells.

Each of the injection wells 42 is cased with a casing 46 as previously described provided with a perforated terminal end 48. The casings 46 should extend down into the aquifer bed 16 so that a chemical treatment additive introduced into each of the injection wells 42 will be distributed directly into the aquifer.

Referring again specifically to FIG. 2 and particularly the upper part of the drawing, the transverse outlet of tee 34 has a bypass and recycle pipe line 50 connected thereto which is joined to the inlet of an in line mixer 52 (see FIG. 3 for a detailed showing of the mixer). Line 54 connected to the outlet end of the axial flow mixer 52 is connected to one end of an elongated quiescent and contact chamber 56 which typically may be a pipe in the order of 16 inches in diameter and 50 to 75 feet in length (preferably about 60 feet) generally buried in the ground and extending in a horizontal direction as illustrated. An outlet pipe 58 joined to the end of chamber 56 opposite inlet pipe 54, is connected in parallel to each of a series of distributor lines 60 which are in turn coupled to vertical pipes 62 located within and extending to the lower part of each of the injection well casings 46. A variable, manually controllable flow regulating device 61 is provided in each of the pipes 62 as an alternate means of limiting flow of treatment water to respective injection wells. The lower ends 64 of respective pipes 62 are also perforated to permit treated water injected into wells 42 to be distributed into the aquifer bed 16 via the perforated terminal ends 48 of injection well casings 46.

Again referring to the in line mixer 52, an injector pipe 66 having a metering pump 68 therein is connected to a chemical treatment additive supply source or vessel 70 and is designed to permit introduction of a selected amount of a chemical additive directly into the mixer 52 in transverse relationship to the axial flow of water therethrough. Mixer 52 has internal baffles 72 (FIG. 3) which assure optimum dispersion and mixture of the additive with the liquid directed to the mixer 52. Surge suppressor 74 may be provided if desired on the line 66 to assure an even flow of additive to the bypass and recycle water flowing through the mixer 52. Although many types of mixers may be used for purposes of this invention, the device illustrated is of preferred characteristics by virtue of the cross current mixing obtained and counter rotating vortices produced within the interior of the mixer chamber.

FIG. 4 illustrates the rosette or petal shaped flow distribution patterns of treatment water injected into the ground at respective injection wells 42 in surrounding relationship to the central production well 44 to be restored and/or maintained. The treatment water containing a chemical additive is discharged into the aquifer bed 16 at the lower end of each of the casings 46 and then tends to spread out from a corresponding injection site in opposite directions while still tending to flow toward the inlet portion 26 of well casing 14. By virtue of the fact that water is being drawn into the perforated section 26 of casing 14 with increasing velocity as the production well site is approached, the flow patterns of the treatment water are of the rosette configuration illustrated in that the treatment composition initially tends to disperse outwardly in all directions within the aquifer bed 16, but then is progressively drawn toward the inlet of the well 44 in a progressively narrower flow pattern. Based on calculated and empirical information, the injection wells 42 should be located substantially as depicted in FIG. 4, wherein the treatment water flows along respective paths of travel which tend to overlap to a certain extent adjacent the vertical casing 14 of well 44. As indicated on FIG. 4, the distance to the point of full convergence of the treatment water may be indicated as the distance "A" which is from the center of well 44 to the point "X". The geometry for dispersion of a six well pattern therefore requires approximately double the length "A" and as a consequence the radius "R" for each of the injection wells 42 is approximately two "A".

Well efficiency may be defined as the actual specific capacity adjusted for a well loss divided by the theoretical capacity. It is generally understood that a newly constructed well should attain at least 80 percent of the theoretical specific capacity. An inefficient well results in excessive drawdown, requiring greater pumping lift, therefore greater energy requirements and resulting in higher operating costs. Corrosion of the well components and encrustation of the particles of the aquifer bed as well as the pumping equipment can significantly decrease the efficiency of a well. These conditions can be alleviated in large measure by treating the well with acidic agents which will precipitate carbonates or sulfates of calcium and magnesium, kill slime producing bacteria and remove encrustations which impede water flow in the aquifer and the production well apparatus. Exemplary acidic agents usable in carrying out the process of this invention include hydrochloric acid (generally introduced as up to 36 percent HCL for restoration purposes) sulfamic acid, hydroxyacidic acid, nitric acid, sulfuric acid, citric acid, acetic acid. Desirably, a one percent solution of normal molar concentration is desirable in the aquifer measured at the discharge point of the main well. For well restoration purposes, the amount of acidic agent introduced into the well should be controlled so that the pH of the discharge of the water is at least about five, preferably in the range of three to five, and under certain extreme conditions within the range of one to three. In carrying out the treatment process hereof, the volume of water in storage at the radius of the injection well circle around the production well 44 should be calculated. Next, an estimate of the quantity of chemical treatment additive needed to alter the nature of the materials lowering the yield of the well should be calculated using known formulas in this respect to give a required concentration of the additive in the aquifer. The quantity of additive introduced into the mixer 52 via line 66 is under the control of metering pump 68 and a valve (not shown) in line 66 if desired. Furthermore, the proportion of discharge water from well 44 diverted into line 50 for delivery to the injection wells 42 may be controlled by adjustment of valve 38, or any other equivalent means (such as the flow regulating devices 61 hereinafter described).

For well restoration purposes, it has been empirically discovered that best results are obtained when no more than about 50 percent of the production water from well 44 is bypassed from line 32 and recycled to the aquifer bed 16 via injection wells 42. Then after the well has been restored to a maximum efficiency, the amount of bypass and recycle can be lowered, generally to a level of about 10 percent of production. Generally speaking, the higher ratio of production diversion and recycle back to the aquifer in conjunction with maximum levels of chemical treatment additive will be carried out for a time approximately twice that period for water to flow from a well 42 to the central production well site 44. In other words, the treatment cycle should be approximately double that of the average residence time of the treatment liquid flowing from the injection wells 42 toward and into the inlet of the well casing 14 of central well 44. During this treatment, the pH of the production water should be monitored to determine whether or not the acidic level required is being achieved. If not, the degree of recirculation may be increased, as well as the ratio of additive in the water brought up to a higher level.

The type of underground material being treated also must be taken into account. For example, acidification of carbonate deposits may be accomplished in a few hours, whereas polyphosphate treatment requires much longer contact times of almost full strength acid. In any event, it is important that the treatment water containing an additive be recycled back to the aquifer on a continuous basis, not only during the well restoration cycle, but also for maintenance purposes as well. The provision of means such as manual or automatic control valve apparatus in the production line permits the operator to adjust the ratio of bypass and recycle water returned to the aquifer at will, and depending upon the particular plugging problems encountered with a specific well. It is generally preferred though that the restoration process involving high bypass and recycle ratios as well as high concentrations of acidic treatment agents be carried out for a period of at least 24 hours, and usually of the order of 48 hours. During this time, the production water allowed to flow from the well generally should be sent to effluent.

One particularly important feature of the present process and apparatus is the fact that the retention time of the chemical treatment additive in the aquifer may be increased as desired by spacing the injection wells 42 further out in the aquifer. Because permeability is a relatively constant number for a particular aquifer formation, flow of chemical treatment additive in the water injected in wells 42 is a function of the formula $Q = AV$ wherein $A$ = area and $V$ = velocity.

Another factor that requires consideration in strategic location of the injection wells 42 is the natural gradient of the aquifer bed 16 surrounding the production well site 44. For example, if the aquifer is slanted in one direction toward the well and there is a certain hydrostatic head attributable to this slant, then the injection wells upgrade from the well should be spaced farther from the central point than those injection areas which are downgrade from the well. This is because of the fact that water on the upgrade side will tend to flow at a faster rate toward the inlet of the well 44, than water on the low side of the grade.

One important factor of the treatment process is the fact that by limiting the bypass and recycle of water from the production supply back to the aquifer in conjunction with a chemical treatment additive, and to maintain such recycle ratio within the range of about 5:50 and preferably about 10 percent, the normal overdesign capacity of a particular well is not exceeded in any way and the efficiency of that particular well for water supply is not deleteriously affected.

The point of injection of chemical treatment water into the aquifer can be controlled not only horizontally in regard to the spacing of the injection points from the central well 44, but also in vertical planes as well. The extremities of the injection well casings 46 may be terminated where desired, either adjacent the top of an aquifer or between that point and the bottom of the aquifer as selected, thus allowing the operator to compensate for various flow patterns, the particular strata encountered in an aquifer requiring restoration, or factors such as the specific gravity of the acidic material being injected into the aquifer. In those cases, where the acid has a relatively high specific gravity, it is generally desirable to introduce the treatment water into the aquifer adjacent the upper layer thereof. In this way, the treatment material may migrate downwardly as it disperses and flows toward the inlet of the casing 14. In similar manner, the outer limits of the locations of the injection wells 42 may be expressed as generally the extremes of the radius of influence of the well in the aquifer. If located beyond this radius of influence, then the treatment water would not disperse and then flow toward the inlet of the central well. Here again though, factors such as underground aquifer gradients must be taken into account in determining the absolute limits of the radius of influence.

It has been discovered that by carrying out the restoration and maintenance procedures on a continuous basis, unexpectedly improved results are obtained. Although the full reason for this treatment efficiency is not fully known and cannot be detailed, it is theorized that continuous flow of the treatment agents toward the well has an advantageous effect in that problems of gasing are eliminated, there is no tendency for blowback, and the flow patterns, chemical equilibrium, and maintenance of additive concentrations may be carried out on a dynamic versus a static basis. It is believed that continual movement of the water at all times results in the chemical reactions taking place in the most beneficial manner. By causing the conditioning agent to flow with the normal movement of water in the operation of the well, then the permeability of the well is effected at the point where water tends to increase in velocity in flowing toward the well and assuring the most efficient cleansing of the aquifer and restoration occurs in the areas of greatest restriction to obtain optimum yield. This acceleration of the treatment agent toward the well site at the area in closest proximity to the well inlet is important in clarification of the aquifer bed and elimination of slime forming bacteria and other plugging agents. In the same vein, carrying out of the maintenance process on a continuous basis is important to retention of the well yield. In those cases where slug treatment was attempted, the conditioning agents never progressed through the plugged area.

Having thus described the invention, what is claimed as new and desired to be secured by Letters Patent is:

1. A method of restoring and/or maintaining an underground aquifer water supply plagued with plugging problems and provided with at least one production well extending downwardly into the aquifer and normally operated on a continuous water delivery basis, the steps of:

drilling a plurality of injection wells in the ground in spaced relationship from one another and said production well in substantially surrounding relationship to the latter and also extending downwardly in the ground to a depth that liquid delivered thereto will flow into the aquifer feeding said production well;

providing water recycle flow routes from a water discharge section of the production well to said injection wells;

introducing a treatment additive into the water recycle flow routes which is capable of altering the nature of naturally occurring flow impeding agents in the aquifer to an extent to decrease the plugging characteristics thereof, and said drilling step further including locating such injection wells in predetermined, relative dispositions causing the additive containing water delivered to the injection wells to flow toward the production well in respective patterns which initially increase in area from corresponding injection sites and then decrease as the production well is approached by virtue of the effect thereon of the flow of water in the aquifer toward the production well;

bypassing a predetermined ratio of water discharged from the well and recycling the same back into the aquifer via said injection wells, said bypass and recycling being carried out on a sustantially continuous basis during delivery of water from the production well.

2. A method as set forth in claim 1 wherein is included the step of:
controlling the rate of addition of the additive to the recycle water in accordance with the average rate of flow of water in the aquifer toward the production well.

3. A method as set forth in claim 1 wherein said step of introducing an additive into the bypass water includes:
adding a quantity of citric acid treatment agent to the recycle water.

4. A method as set forth in claim 1 wherein said step of introducing an additive into the bypass water includes:
adding a quantity of sulfamic acid treatment agent to the recycle water.

5. A method as set forth in claim 1 wherein said step of introducing an additive into the bypass water includes:
adding a quantity of hydroxyacetic acid treatment agent to the recycle water.

6. A method as set forth in claim 1 wherein said step of introducing an additive into the bypass water includes:
adding a quantity of hydrochloric acid treatment agent to the recycle water.

7. A method as set forth in claim 1 wherein said step of introducing an additive into the bypass water includes:
adding a quantity of nitric acid treatment agent to the recycle water.

8. A method as set forth in claim 1 wherein is included the step of varying the amount of additive introduced into the recycle water to control the pH of water in the aquifer subjected to treatment with the additive.

9. A method as set forth in claim 1 wherein the steps of bypassing and recycling water from the production well back to the injection wells via said recycle routes include:
controlling the ratio of bypass to water production within the range of about 1:10 to 1:1.

10. A method as set forth in claim 1 wherein the steps of bypassing and recycling water from the production well back to the injection wells via said recycle routes include:
returning about 10% of the water production back to the injection wells via said recycle route.

11. A method as set forth in claim 1 wherein said step of introducing an additive into the recycle water includes:
providing a mixing zone for the additive and said recycle water upstream of the injection wells.

12. A method as set forth in claim 1 wherein the steps of bypassing and recycling water from the production well to the injection wells include:
allowing the additive to fully mix with the water and effecting dissolution of gaseous constituents in the recycle water occassioned by addition of the additive thereto prior to delivery of the recycle water back to the injection wells.

13. A method as set forth in claim 1 wherein said step of locating the injection wells in predetermined dispositions relative to one another and the production wells includes:
maintaining the spacing of the injection wells such that the flow patterns of the additive containing water introduced into the injection wells tend to overlap to a minor extent upstream of the production well within the aquifer.

14. A method as set forth in claim 1 wherein the steps of bypassing recycling water from the production well to the injection wells include:
bypassing a large proportion of the production water for recycle back to the injection wells during initial treatment to restore water delivery from the production well to a level above that obtained before treatment, and then
decreasing the bypass and recycle flow rate and maintaining such decreased rate on a continuous basis after the water flow level from the production well has been restored to an acceptable rate.

15. A method as set forth in claim 14 wherein the bypass and recycle steps include:
bypassing and recycling up to 50% of the production water back to the aquifer during the restoration of the production well and then reducing the bypass and recycle ratio to about 10% for carrying out the maintenance flow cycle.

16. In a system for restoring and/or maintaining an underground aquifer plagued with plugging problems and used to supply water to a point of use wherein at least one production well extends downwardly onto the aquifer and water is removed therefrom on substantially a continuous delivery basis, the improvement comprising:
a plurality of injection wells in the ground in spaced relationship from one another and said production well in surrounding relationship to the latter and also extending downwardly in the ground to a depth that liquid delivered thereto will flow into the aquifer feeding said production well;
a water discharge line leading from the outlet of the production well;
a water bypass and recycle line including segments from the discharge line to the inlet of each of the injection wells,
structure for introducing a treatment additive into the water flowing through said bypass and recycle line segments from the production well to the injection wells, said additive being capable of altering the nature of naturally occurring flow impeding agents in the aquifer to an extent to decrease the plugging characteristics thereof, and the injection wells being located in predetermined, relative dispositions such that the additive containing water delivered to the injection wells flows toward the production well in respective patterns which initially increase in area from corresponding injection sites and then decrease as the production well is approached by virtue of the effect thereon of the flow of water in the aquifer toward the production well;.

means operably associated with said bypass and recycle line segments for controlling the flow of liquid therethrough permitting selective variation of the amount of additive containing water which is returned to the injection wells for delivery back into the aquifer, as a proportion of the water delivered from the production well on a substantially continuous basis.

17. A system as set forth in claim 16 wherein is provided mixing means in said bypass and recycle line downstream of the additive introduction structure.

18. A system as set forth in claim 17 wherein is provided an elongated contact chamber in said bypass and recycle line downstream of the additive introduction structure and ahead of the injection well.

19. A system as set forth in claim 17 wherein is provided a plurality of injection wells in spaced relationship from one another and in surrounding relationship to the production well, said bypass and recycle line including segments extending from the discharge line to all of the injection wells.

20. A system as set forth in claim 17 wherein is provided means in one of the lines for permitting selective variation of the flow of water therethrough to permit control of the relative ratio of water discharged from the production being delivered to the point of use of sent back to the aquifer via the injection well.

* * * * *